United States Patent
Terefe et al.

(10) Patent No.: US 12,235,396 B1
(45) Date of Patent: Feb. 25, 2025

(54) LIDAR OBSTRUCTION DETECTION

(71) Applicant: Zoox, Inc., Foster City, CA (US)

(72) Inventors: Nehemia Girma Terefe, Santa Barbara, CA (US); Mohammad Umar Piracha, Union City, CA (US); Samantha Marie Ting, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 521 days.

(21) Appl. No.: 17/551,078

(22) Filed: Dec. 14, 2021

Related U.S. Application Data

(60) Provisional application No. 63/281,030, filed on Nov. 18, 2021.

(51) Int. Cl.
| | | |
|---|---|---|
| *G01S 7/497* | (2006.01) | |
| *B60S 1/54* | (2006.01) | |
| *B60W 60/00* | (2020.01) | |
| *G01S 17/89* | (2020.01) | |
| *G01S 17/931* | (2020.01) | |

(52) U.S. Cl.
CPC ............ *G01S 7/497* (2013.01); *B60S 1/54* (2013.01); *B60W 60/001* (2020.02); *G01S 17/89* (2013.01); *G01S 17/931* (2020.01); *B60W 2420/408* (2024.01); *G01S 2007/4977* (2013.01)

(58) Field of Classification Search
CPC ........ G01S 7/497; G01S 17/89; G01S 17/931; G01S 2007/4977; B60S 1/54; B60S 1/566; B60S 1/56; B60S 1/0848; B60S 1/0818; B60S 1/02; B60S 1/485; B60W 60/001; B60W 2420/408; G02B 27/0006
See application file for complete search history.

(56) References Cited

U.S. PATENT DOCUMENTS

| | | | |
|---|---|---|---|
| 11,550,044 B2 * | 1/2023 | Kudla | G01S 7/4817 |
| 2016/0140403 A1 * | 5/2016 | Nagata | B60R 1/12 |
| | | | 382/104 |
| 2018/0143298 A1 * | 5/2018 | Newman | G02B 27/0006 |
| 2018/0272998 A1 * | 9/2018 | Schmidt | B05B 7/2424 |
| 2019/0146494 A1 * | 5/2019 | Li | B60N 2/01 |
| | | | 701/23 |
| 2019/0202411 A1 * | 7/2019 | Zhao | B60S 1/52 |
| 2020/0249329 A1 * | 8/2020 | Herman | G01S 17/931 |
| 2020/0292679 A1 * | 9/2020 | Osiroff | G01S 7/4808 |
| 2020/0391231 A1 * | 12/2020 | Arunmozhi | F16L 27/023 |
| 2021/0197769 A1 * | 7/2021 | Shirakura | B60S 1/56 |
| 2022/0179057 A1 * | 6/2022 | Shotan | G01S 7/497 |
| 2022/0337798 A1 * | 10/2022 | Kennedy | H04N 13/239 |

* cited by examiner

*Primary Examiner* — Anne Marie Antonucci
*Assistant Examiner* — Connor L Knight
(74) *Attorney, Agent, or Firm* — Lee & Hayes, P.C.

(57) ABSTRACT

Techniques for detecting an obstruction associated with a lidar sensor are discussed herein. For example, a computing device can implement an obstruction detection component to detect rain, mud, dirt, dust, snow, ice, animal droppings, etc., on and/or near an outer surface of the lidar sensor. The obstruction detection component can apply one or more heuristics and/or models to the lidar data and/or compare pulse information associated with the lidar data to a threshold to determine a size, a type, or a location of an obstruction blocking a lidar beam.

20 Claims, 6 Drawing Sheets

LIDAR OBSTRUCTION DETECTION

RELATED APPLICATION

This application claims priority to U.S. Provisional Application No. 63/281,030, filed Nov. 18, 2021, titled "LIDAR OBSTRUCTION DETECTION," the entirety of which is incorporated herein by reference.

BACKGROUND

Accurate determinations of object characteristics can assist, for example, an autonomous vehicle to traverse the environment. However, the quality of the data collected by sensors may become degraded in certain circumstances, including based on environmental factors such as weather, traffic, or road conditions, as well as based on internal errors or malfunctions that may occur within the sensors themselves. In such cases, the data collected by the sensors may be suboptimal or even unsuitable for use, potentially impacting vehicle navigation, obstacle detection and avoidance, and other functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DESCRIPTION

Figure 1:
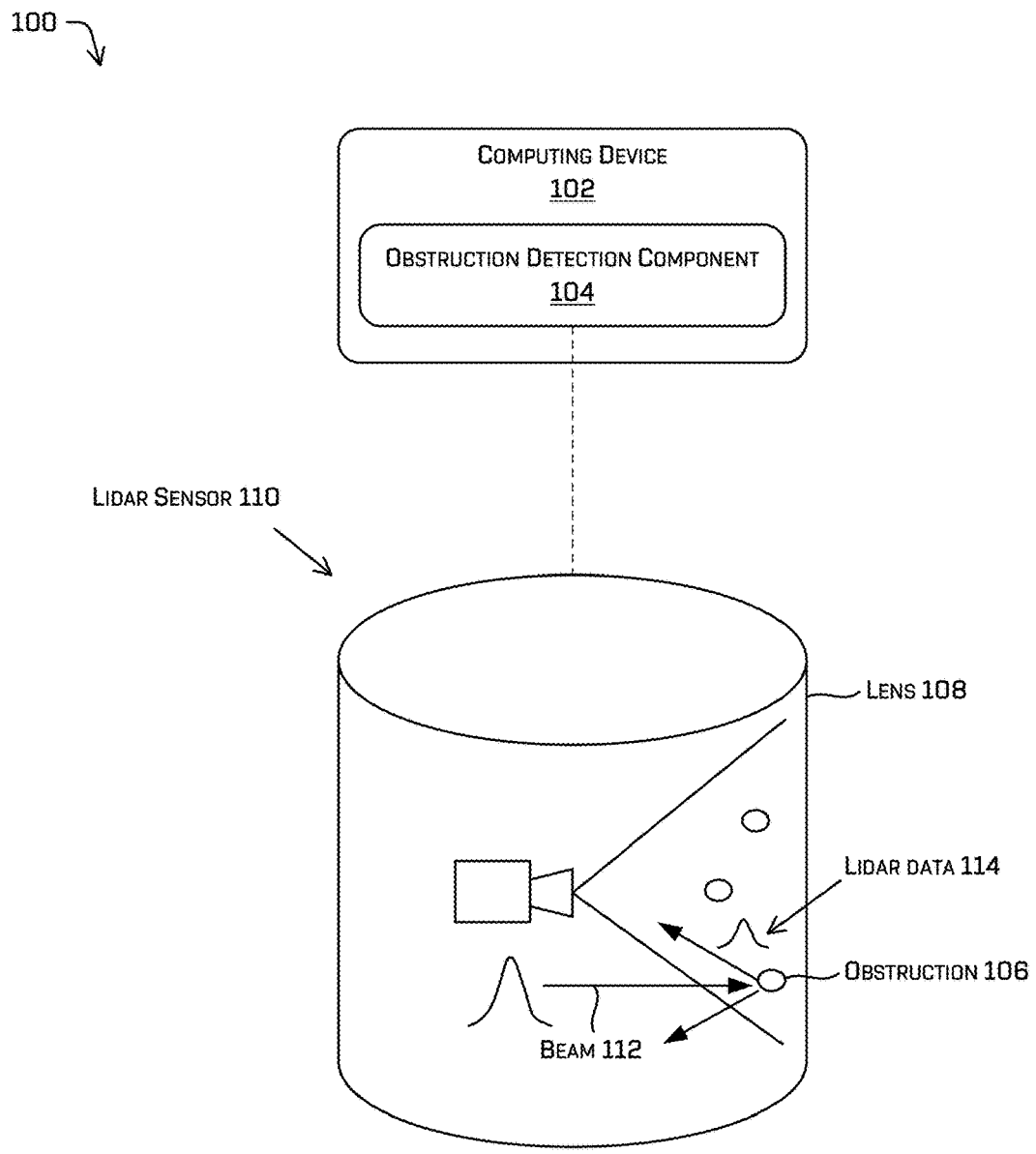
FIG. 1 is an illustration of an example environment, in which an example computing device detects an obstruction associated with an example sensor.

Techniques for detecting an obstruction associated with a lidar sensor are discussed herein. The techniques may include detecting and locating foreign object(s), material(s), and/or particle(s) on an outer surface of the lidar sensor. For instance, a computing device can implement an obstruction detection component to detect rain, mud, dirt, dust, snow, ice, animal droppings, and the like, on and/or near (e.g., less than one centimeter) the outer surface of the lidar sensor. The obstruction detection component can receive raw sensor data representing beam and/or pulse information detected at substantially zero distance from the outer surface of the lidar sensor. The obstruction detection component can apply one or more heuristics or other model(s) to the raw sensor data (e.g., lidar data not associated with a point cloud) and/or compare information associated with the raw sensor data to a threshold to determine whether a portion of the lidar sensor is experiencing a partial or total blockage of a beam.

In some examples, techniques can include inputting the raw sensor data into a machine learned model trained to output a likelihood and/or confidence associated with the return being from obstruction on a lens of the sensor. In such examples, training data may be generated based at least in part on other techniques including, but not limited to, use of perception information from camera systems focused on the lens, artificial introduction of such obstacles, and/or simulated introduction of such obstacles. The raw sensor data can represent data from a sensor prior to being processed by the sensor or a computing device associated with the sensor (e.g., prior to post-processing). For instance, the raw sensor data can represent raw lidar data that is data prior to being converted to lidar point cloud data.

Using the techniques described herein, an obstruction score representing a degree of transparency can be determined for a lidar sensor operating on an autonomous vehicle, and the obstruction score can be used to control the autonomous vehicle (e.g., determine a vehicle trajectory, modify perception operations to reduce reliance on the portion of the sensor that is obstructed, operate the vehicle in one direction, pull the vehicle over, initiate a communication to a remote operator for assistance, etc.) and/or to initiate a cleaning operation (e.g., cause an air jet or other cleaning system to remove the obstruction, change a parameter of a sensor to compensate for the obstruction, etc.). By implementing the techniques described herein, safety of the autonomous vehicle can be improved by performing an action that mitigates an obstruction of a sensor used for "seeing" an environment.

Generally, the obstruction detection component can identify behavior of pulse data captured on and/or near a lidar sensor. For example, the lidar sensor can generate a lidar beam for transmission into an environment, and the transmission can be affected by foreign particle(s) on the lidar sensor. The foreign particle(s) can vary in size and particle type thereby affecting a distance the lidar beam travels into the environment from the lidar sensor. For example, the lidar sensor can be obstructed such that the lidar beam fails to travel beyond a lens or housing of the lidar sensor and/or the obstruction can allow some transparency for the lidar beam to capture lidar data at different distances from the lidar sensor (e.g., the obstruction causes scattering, partial reflections, or partial absorption, etc. of the emitted light). Regardless, the obstruction detection component environment can be configured to determine characteristics of the obstruction (e.g., severity, size, shape, etc.), and determine an action based at least in part on the characteristics of the obstruction (e.g., clean the lidar sensor at the identified location of the obstruction, cause the vehicle to navigate to a safe location, restrict a direction of travel of the vehicle (e.g., in the case of a bidirectional vehicle), cause the vehicle to receive assistance from a teleoperator (e.g., a remote computing device), alter a perception component to reduce reliance on the lidar sensor in favor of other available sensors, etc.). In at least some examples, the lidar sensor may be used in dual- or multiple-return mode to receive multiple lidar returns per pulse.

In some examples, in addition to receiving raw sensor data, the obstruction detection component can also receive lidar point cloud data, and determine the obstruction score based at least in part on the raw sensor data and the lidar point cloud data. The lidar point cloud data from the same lidar sensor, or from other lidar sensors operating in the environment, can be used to detect or verify a region in the environment lacking lidar data points and/or having lidar points associated with a low confidence. In one example, a field of view of another lidar sensor, radar sensor, image sensor, etc. can be used to determine whether the lack of lidar points is due to an obstruction or an error in capturing sensor data. However, in other examples the raw sensor data can be processed by the obstruction detection component without consideration to lidar point cloud data (e.g., the lidar point cloud data may not be available).

As mentioned, the obstruction detection component can detect behavior (e.g., an abnormality, anomaly, or difference in behavior over time) in pulse data that represents an obstruction to a lidar sensor. The obstruction detection component can determine an obstruction type (e.g., rain, dirt, dust, snow, ice, animal droppings, etc.) based at least in part on the behavior of the pulse data. In various examples, the obstruction detection component can determine an obstruction score indicating an amount of lidar beam energy lost and/or transmitted based at least in part on the obstruction type.

The obstruction detection component can compare sensor data received as input (e.g., raw lidar data, lidar point cloud data, image data, and so on) to previous data (e.g., log data) or expected results to determine an obstruction. For instance, pulse information associated with raw lidar data can be compared to previous pulses in previous raw lidar data to determine a change in pulse information. Additionally or alternatively, pulse information associated with raw lidar data can be compared to expected results based on environment information, vehicle information housing the sensor, or other information. In some examples, the obstruction detection component can utilize a look-up table to make determinations described herein.

The techniques can include the obstruction detection component reducing an amount of backscattering associated with the lidar sensor. For example, upon detecting an obstruction, the obstruction detection component can cause a cleaning system to clean a region of the lidar sensor. In various examples, the obstruction detection component can locate a region on the housing of the lidar sensor that is associated with an obstruction, and cause the cleaning system to clean the obstruction in the located region thereby mitigating the backscattering.

In various examples, the obstruction detection component can send a request to the lidar sensor to receive a particular type of data. For instance, the obstruction detection component can generate a communication for sending to the lidar sensor that identifies an interface for using by the lidar sensor. The interface can include a time associated with a digital conversion or an analog to digital conversion, just to name a few. The lidar data received from the lidar sensor can be based at least in part on sending the communication.

In various examples, the lidar data received from the lidar sensor can represent pulse data associated with different times. The obstruction detection component can, for instance, compare angle information, elevation information, spatial information, etc. (e.g., first azimuth information or first channel information) associated with a first pulse at a first time to corresponding information associated with a second pulse at a second time. Based on the comparing, the obstruction detection component can determine a size and/or a location of an obstruction on and/or near the lidar sensor. An action can be performed based at least in part on the size and/or the location (or other characteristics) of the obstruction on the lidar sensor. The action can include at least one of: initiating a cleaning operation to clean the lens of the lidar sensor; controlling an autonomous vehicle in an environment; changing a power level at which to operate the sensor, or generating a request for lidar point cloud data associated with a distance beyond a few centimeters from the housing of the lidar sensor.

As mentioned, the obstruction detection component can determine an obstruction near the lidar sensor including prior to the obstruction at least partially covering the lidar sensor (or other sensor). In various examples, the obstruction detection component can predict a size and/or a location of an obstruction prior to the obstruction covering a portion of an outer surface of the lidar sensor. For example, a camera can detect rain (or other obstruction type), and initiate an action to mitigate the obstruction before the lidar sensor becomes obstructed. In this way, a vehicle can be controlled and/or a sensor can be cleaned (e.g., air can be used to dispel the potential obstruction, a cleaning solution can be applied at the time of the obstruction reaching the lidar sensor (or immediately thereafter)).

In some examples, the obstruction detection component can determine a difference between a baseline pulse height and a height of a pulse associated with lidar data, and determine, based at least in part on the difference, a degree of transparency associated with the lens of the lidar sensor. In such examples, the degree of transparency can be compared to a transparency threshold, and based on the comparison, an action as described herein can be performed. In at least some examples, such a baseline and/or detection may be based at least in part on a known excitation energy (e.g., transmission laser intensity) and/or otherwise normalized based at least in part on such a lidar output power. As a non-limiting example of such, a threshold associated with an amplitude for return signals (e.g., raw sensor data) may be normalized to an output power such that when low power is used, the threshold is lowered. Of course, non-linear weightings are contemplated.

The obstruction detection component can, in some examples, determine presence of an obstruction on at least a portion of the lens of the lidar sensor by identifying a behavior of a pulse in the lidar data over time. A machine learned model can be used to determine a classification of the obstruction (e.g., predict a type of obstruction and/or the detection of the obstruction). In various examples, a vehicle or other robotic device can initiate a cleaning operation or navigation operation based at least in part on the identified behavior and/or the classification of the obstruction.

Based on a comparison of a degree of transparency relative to the transparency threshold, the obstruction detection component can request lidar point cloud data (if available) and compare the lidar pulse information associated with the lidar data to the lidar point cloud data. For instance, an area of the environment that lacks lidar returns further from the lens of the lidar sensor can be used to confirm an obstruction on the lens. That is, lidar point cloud data at various distances from the lidar sensor can be used to confirm or verify pulse information associated with raw lidar data. In at least some examples, such a threshold may be associated with an amplitude based on a number of samples at a particular azimuth and channel (e.g., azimuth 0 degrees and channel 12). In some examples, the obstruction detection component can receive lidar point cloud data independent of the obstruction detection component sending a specific request for the lidar point cloud data (e.g., can be received from one or more lidar sensors periodically at a pre-determined rate).

In some examples, the obstruction detection component can be included in a vehicle computing device of an autonomous vehicle that is bi-directional (a front region can change depending upon a direction of travel). By way of example and not limitation, detecting an obstruction on a sensor coupled to a front region or rear region of the autonomous vehicle can cause the autonomous vehicle to operate in a single direction that minimizes reliance on the obstructed sensor to improve safety. For instance, in an environment with relatively strong wind and rain, sensors in the front region or the rear region can be impacted differently, and detecting an obstruction on a sensor in the front region or the rear region can be used to determine a direction of travel that causes the lidar sensor to be in a region that is less impacted relative to the other region. In other words, the autonomous vehicle can be controlled in the environment by determining a direction of travel for the autonomous vehicle based at least in part on a location of the lidar sensor on the autonomous vehicle, and a degree of transparency associated with the lidar sensor.

In some examples, upon detecting a change in a degree of transparency of a lidar sensor from a first time to a second time, a power output of the lidar sensor can be adjusted, and another degree of transparency can be determined at the adjusted power output. A difference between degrees of transparency of the lidar sensor at varying power outputs can be used to confirm, verify, or modify an amount of transparency determination.

In some examples, some or all of the aspects of the techniques for detecting an obstruction can be performed by a machine learned model (e.g., a neural network, a convolutional neural network, a recurrent neural network, a curve fitting, statistical modeling, and the like) trained to perform the particular technique. A machine learned model can be trained based on data manually or automatically annotated to an obstruction type associated with a lidar sensor, and the like.

The obstruction detection techniques described herein can improve a functioning of a computing device by providing a robust method of estimating or otherwise determining a level of obstruction associated with a sensor. For example, determining whether a sensor is properly operating can allow subsequent processes associated with an autonomous vehicle (e.g., classification, tracking, prediction, route planning, trajectory generation, and the like) to be performed more accurately, may require less processing power, and/or may require less memory. In some instances, faster and/or more accurate obstruction detection can be used in generating a trajectory of the autonomous vehicle, which can improve safety for occupants of an autonomous vehicle. In some examples, the techniques can be used in a self-test operation associated with a system to evaluate a performance of the system which provides for greatly improved overall reliability and safety outcomes. Further, the techniques discussed herein may be incorporated into a system that can be validated for safety.

FIG. 1 is an illustration of an example environment 100, in which an example computing device detects an obstruction associated with an example sensor. For instance, a computing device 102 can implement an obstruction detection component 104 to detect an obstruction 106 on a lens 108 of a lidar sensor 110. In some examples, the computing device 102 can be associated with a test environment or a robotic device such as an autonomous vehicle navigating in an environment.

Generally, the obstruction detection component 104 can identify behavior of pulse data captured on and/or near the lens 108 (e.g., a housing, cylinder, outer surface, beam exit point, etc.) of the lidar sensor 110. For example, the lidar sensor 110 can generate a beam 112 for transmission into the environment 100, and the transmission can be affected by the obstruction 106 (e.g., foreign particle(s) on the lidar sensor). In some examples, the obstruction detection component 104 can receive lidar data 114 representing beam and/or pulse information detected at substantially zero distance (on or within several centimeters) from an outer surface (e.g., the lens 108) of the lidar sensor 110, and implement one or more heuristics to the lidar data 114 (e.g., lidar data not associated with a point cloud). For example, the obstruction detection component 104 can compare the pulse information associated with the lidar data 114 to a pulse threshold to determine whether a portion of the lidar sensor 110 is experiencing a partial or total blockage of a beam. In examples when the pulse information indicates that an amplitude of a pulse is above a pulse threshold, the obstruction detection component 104 can output an indication of the obstruction 106. In various examples, the obstruction detection component 104 can represent a machine learned model trained to detect differences in pulse information over time. Additional discussion of comparing pulse information to a threshold can be found throughout this disclosure including in FIGS. 3 and 4.

The lidar data 114 can, for example, represent raw lidar data that has not been post-processed (or otherwise filtered) by the lidar sensor 110. That is, data captured by the lidar sensor 110 that is free of modifications caused by a processor associated with the lidar sensor 110 can be sent from the lidar sensor 110 to the obstruction detection component 104. By not post-processing data captured by the lidar sensor 110, raw lidar data representing areas close to the lens 108 can be available for processing by the obstruction detection component 104. In various examples, such raw data may be associated with a detected received power per unit time. Generally, the raw lidar data can represent data captured by the lidar sensor 110 prior to being converted to lidar point cloud data, or other processed lidar data.

In some examples, the obstruction detection component 104 can determine an obstruction score representing a degree of transparency for the lidar sensor 110, a likelihood of the obstruction 106, and/or a confidence of the obstruction 106. For example, the obstruction score can represent an impact of the obstruction 106 on the lens 108. The obstruction score can be determined based at least in part on characteristics of the pulse information (e.g., amplitude, width, distance from the lens 108, etc.). In one example, the obstruction score can be based at least in part on a value associated with the amplitude of a pulse on or near the lens 108 (e.g., an amplitude value of the pulse can affect obstruction score).

The obstruction score may also or instead be based on comparing pulse information associated with different output power, distances, and/or times. For instance, the obstruction detection component 104 can determine the obstruction score representing the degree of transparency for the lidar sensor 110 based at least in part on comparing pulse information associated with different distances from the lens 108. In one example, the obstruction detection component 104 can receive lidar data representing first pulse information associated with a first distance that is less than a threshold distance from the lens 108 (e.g., less than 10 centimeters), and second pulse information associated with a second distance that is greater than the threshold distance from the lens 108 (e.g., greater than 10 centimeters, greater than 60 centimeters, etc.). The obstruction detection component 104 can determine a difference between the first pulse information and the second pulse information, and the obstruction score can be based at least in part on the difference. In at least some examples, such first and second distances may be based on expected detections in a scene. As a non-limiting example of such, when such a lidar sensor is mounted to a vehicle driving down a highway, the likelihood that an object is 0.5 m or less to the vehicle is presumed to be low. And, therefore, a comparison may be made for returns associated with a distance of −0.01 m to 0.01 m with those returns associated with a distance of 0.25 m to 0.5 m, for example.

The obstruction detection component 104 can also or instead determine a size and/or a location of the obstruction 106 on the lens 108, and the obstruction score can further represent the size and/or the location of the obstruction 106. For example, relatively larger obstructions having lower transparency (e.g., mud, cloth, etc.) and located in an area of the lens 108 that causes a greater impact to operation of the lidar sensor 110 (e.g., more backscattering) can result in a higher obstruction score (relative to an obstruction with higher transparency like rain and/or an obstruction that causes relatively less backscattering due to a location of the obstruction on the lens 108). To determine the size and/or the location (or region) of the obstruction 106, the obstruction detection component 104 can compare angle information, spatial information, and the like for two or more pulses (e.g., first azimuth information or first channel information associated with a first pulse of the lidar data to second azimuth information or second channel information associated with a second pulse of the lidar data). The angle information can represent different angles of emission for one or more beams leaving a lidar sensor. The spatial information can represent an x-coordinate, y-coordinate, z-coordinate, or other positional data, associated with one or more beams emitted from the lidar sensor.

The output from the obstruction detection component 104 can identify a characteristic (e.g., severity, size, shape, etc.) of the obstruction 106, and one or more actions can be initiated by the obstruction detection component 104 based at least in part on the characteristic of the obstruction. For example, the obstruction detection component 104 can cause a cleaning system to clean the lidar sensor at the identified location of the obstruction, cause a vehicle to navigate to a safe location, cause a vehicle to receive assistance from a teleoperator (e.g., a remote computing device), alter a setting of the lidar sensor 110 (e.g., increase power output and/or reduce reliance on the lidar sensor 110 in favor of other available sensors, etc.). In some examples, the action can include generating a request for lidar point cloud data a threshold distance from the lens 108 (e.g., over sixty centimeters from the lens 108), and the lidar point cloud data can be used to validate, update, or modify a determination by the obstruction detection component 104 (e.g., to validate existence and severity of the obstruction 106). Performing the one or more actions based at least in part on the output from the obstruction detection component 104 is discussed throughout this disclosure including in FIG. 2-6.

In various examples, an output from the obstruction detection component 104 can be used to initiate a cleaning operation to remove the obstruction 106 from the lens 108 of the lidar sensor 110 and/or compensate for the obstruction 106. The cleaning operation can be mechanical, such as when using air or water cleaning solutions, and/or filter based such as when modifying a control policy and/or operating parameter of the lidar sensor 110. Thus, the cleaning operation can include removing some or all of the obstruction 106 and/or removing artifacts during processing of the lidar sensor 110. For example, the obstruction score can be compared to an obstruction threshold, and the cleaning operation can be initiated by the obstruction detection component 104 when the obstruction score meets or exceeds the obstruction threshold. The obstruction threshold can be determined based on an impact to operation of the lidar sensor 110 (e.g., a value at which the lidar sensor performance degrades below a pre-determined amount).

The obstruction 106 can include one or more of: rain, mud, dirt, dust, snow, ice, animal droppings, cloth, plastic, sticker, and so on. Different types of obstructions can be associated with different pulse information such that the obstruction detection component 104 can be trained to classify a type of obstruction on the lens 108. Pulse information for rain can include a different pulse amplitude, width, etc. than pulse information for snow. By applying heuristics and/or a machine learned model to the lidar data 114 (or raw lidar data), the obstruction detection component 104 can determine a classification of the obstruction 106, and an action can be initiated based on the classification. For example, a classification that the obstruction 106 is mud or animal droppings can result in initiating a cleaning operation to remove the obstruction whereas a classification of rain can result in increasing power output of the lidar sensor 110 or the computing device 102 relying more heavily on other available sensor.

Using the techniques described herein, actions can be performed to detect and/or mitigate backscattering (and the problems associated therewith) caused by the obstruction 106. For example, the obstruction score of the lidar sensor 110 can cause the computing device 102 to change power output by the lidar sensor 110, determine a level of confidence in data received from the lidar sensor 110, or initiate cleaning of the lens 108.

Figure 2:
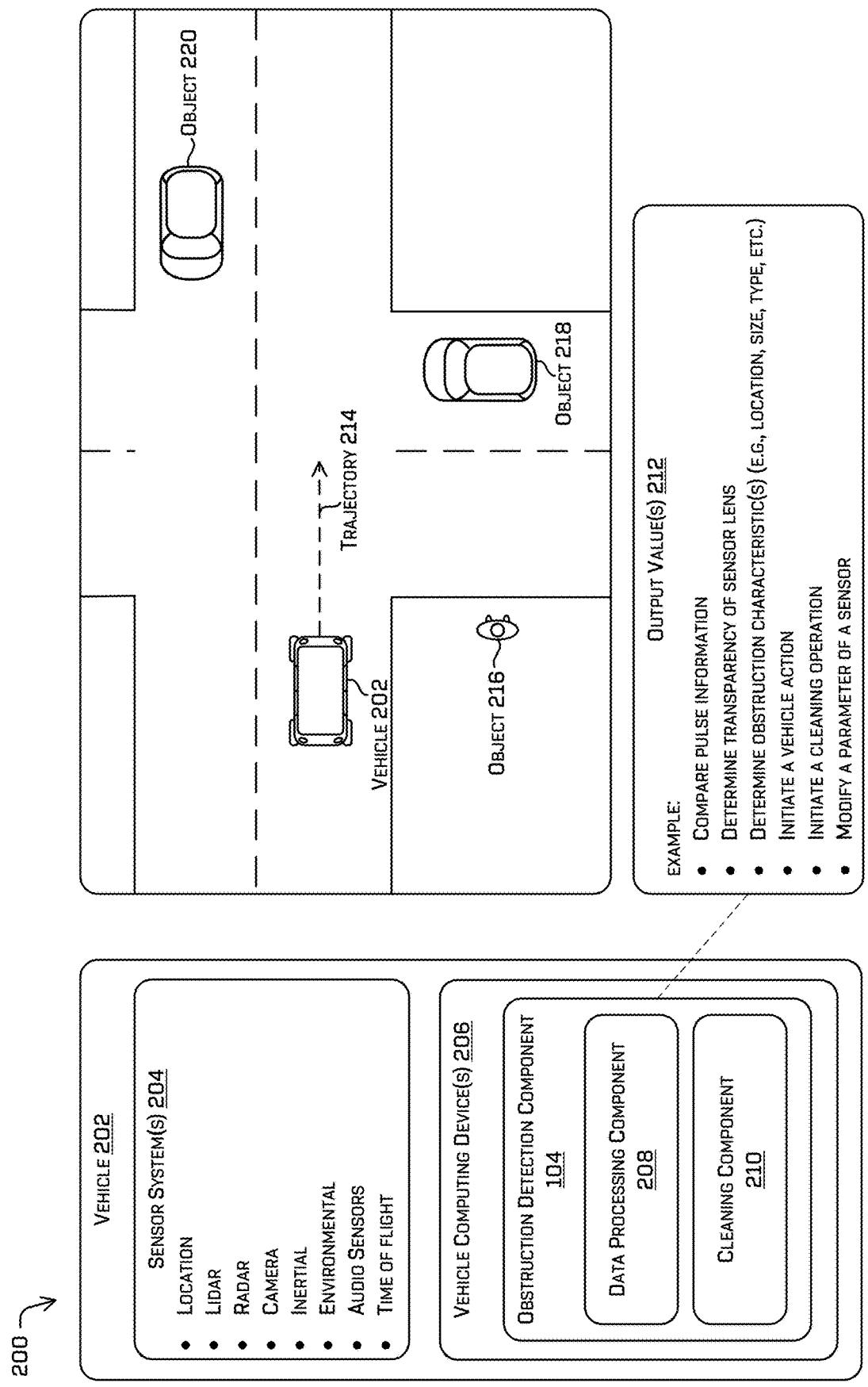
FIG. 2 is a pictorial diagram illustrating an example implementation to detect an obstruction associated with an example sensor.

FIG. 2 is a pictorial diagram illustrating an example implementation 200 to detect an obstruction associated with an example sensor. For instance, a vehicle 202 includes one or more sensor system(s) 204 and one or more vehicle computing device(s) 206 to navigate in an environment. In various examples, the vehicle 202 can represent a bi-directional autonomous vehicle. The vehicle computing device(s) 206 (also referred to the vehicle computing device 206) can include the obstruction detection component 104 of FIG. 1 which further includes a data processing component 208 and a cleaning component 210 to implement the obstruction detection techniques described herein. The vehicle 202 may include the vehicle 502 of FIG. 5.

In some examples, the one or more sensor system(s) 204 can include one or more of: a location sensor, a lidar sensor, a radar sensor, a camera, an inertial sensor, an environmental sensor, an audio sensor, and/or a time-of-flight sensor, just to name a few. Sensor data captured by the one or more sensor system(s) 204 can be sent to the obstruction detection component 104. Sensor data associated with a camera can, for example, be used by the obstruction detection component 104 to verify presence of a weather event (e.g., rain, snow, etc.). Sensor data from one of the sensor system(s) 204 may also or instead be used to verify determinations by the obstruction detection component 104 (e.g., a camera or other sensor can verify that a region in lidar point cloud data is associated with an obstruction rather than being an error in detection).

The obstruction detection component 104 can identify, detect, or otherwise determine an obstruction(s) associated with one or more sensor system(s) 204 based at least in part on applying heuristics and/or a machine learned model to sensor data received from the one or more sensor system(s) 204. For instance, the obstruction detection component 104 can detect an obstruction (e.g., the obstruction 106) on a lidar sensor, or other sensor, coupled to the vehicle 202.

The data processing component 208 can represent functionality to determine presence of an obstruction and/or an obstruction score representative of a degree of transparency associated with a sensor. The data processing component 208 can receive and/or transmit data between the sensor system(s) 204 as well as other components of the vehicle computing device 206. For instance, the data processing component 208 can receive lidar data as input and generate one or more output value(s) 212 for transmitting to one or more components of the vehicle computing device (s) 206.

The cleaning component 210 can represent functionality to clean the one or more sensor system(s) 204. For example, the cleaning component 210 can cause air, a cleaning solution, water, etc. to remove at least a portion of the obstruction from a sensor. In some examples, cleaning can be directed to a location of the obstruction on the lens 108 (as opposed to all portions of the lens 108).

The techniques can include the obstruction detection component reducing an amount of backscattering associated with the lidar sensor. For example, upon detecting an obstruction, the obstruction detection component 104 can cause a cleaning system to clean at least a portion of the lidar sensor. In various examples, the obstruction detection component 104 can locate a region on a housing (lens) of the lidar sensor that is associated with an obstruction, and cause a cleaning system to clean the obstruction in the located region thereby mitigating the backscattering. Additional details of cleaning a sensor are described in U.S. patent application Ser. No. 16/864,146, filed Apr. 30, 2020, entitled "Sensor Pod Cleaning System," which is incorporated herein by reference in its entirety and for all purposes.

As mentioned, the data processing component 208 can generate the one or more output value(s) 212 (also referred to as the output value 212) based at least in part on the lidar data. In some examples, the data processing component 208 can receive the lidar data from the lidar sensor based at least in part on sending a communication indicating a lidar interface type to the lidar sensor. The lidar sensor can send the lidar data to the data processing component 208 in accordance with the requested lidar interface type. Example lidar interface types can include a time to digital conversion, an analog to digital conversion, and so on. The data processing component 208 can apply an algorithm, heuristic, and/or machine learned model to the lidar data to determine the output value(s) 212 representing: compared pulse information associated with different distance and/or times, a degree of transparency of a sensor lens, an obstruction characteristic (e.g., a location, size, classification, etc.), a communication to initiate a vehicle action, a communication to initiate a cleaning operation, a communication to modify a parameter of a sensor, among others.

In some examples, the data processing component 208 can also receive lidar point cloud data from the lidar sensor (or other lidar sensor), and output determinations based at least in part on the lidar data (e.g., raw lidar data) and the lidar point cloud data. In some examples, the lidar point cloud data can be received as the lidar sensor captures the data while in other examples the data processing component 208 can generate a request for the lidar point cloud data, and the data processing component 208 can receive the lidar point cloud data based on the request. The lidar point cloud data can be associated with distance greater than a distance associated with the raw lidar data. That is, the raw lidar data can include pulse information at various distances including at a distance on or near (e.g., 0-5 millimeters) an outer surface of the lidar sensor, and the lidar point cloud data can be associated with a distance greater than 5 millimeters. In various examples, the data processing component 208 can implement a machine learned model to generate the output value 212 indicating a likelihood of an obstruction on or near the lidar sensor.

The vehicle can perform various actions based at least in part on the output value(s) 212. For instance, the data processing component 208 can generate a communication for sending to a planning component to cause the planning component to determine a trajectory 214 for the vehicle 202 to follow in the environment. The trajectory 214 (e.g., direction, speed, acceleration, etc.) can enable the vehicle to avoid static and/or dynamic objects such as a pedestrian (object 216) and other vehicles (e.g., object 218 and object 220). The output value(s) 212 can also or instead be used by the vehicle computing device 206 to determine a position, a pose, a velocity, etc., of the vehicle 202. Potential actions by the vehicle 202 are further described in relation to FIG. 5, and elsewhere.

In some examples, the output value 212 can represent an obstruction score usable to control an autonomous vehicle (e.g., determine the trajectory 214 for vehicle 202), modify perception operations to reduce reliance on the sensor that is obstructed, operate the vehicle 202 in one direction, pull the vehicle 202 over, initiate a communication to a remote operator for assistance, etc. For example, controlling the autonomous vehicle in the environment can comprise determining a direction of travel for the autonomous vehicle based at least in part on a location of the lidar sensor on the autonomous vehicle. By implementing the techniques described herein, safety of the autonomous vehicle can be improved by performing an action that mitigates an obstruction of a sensor used for "seeing" an environment (e.g., detection of objects can be improved to enable the vehicle to navigate more safely).

Figure 3:
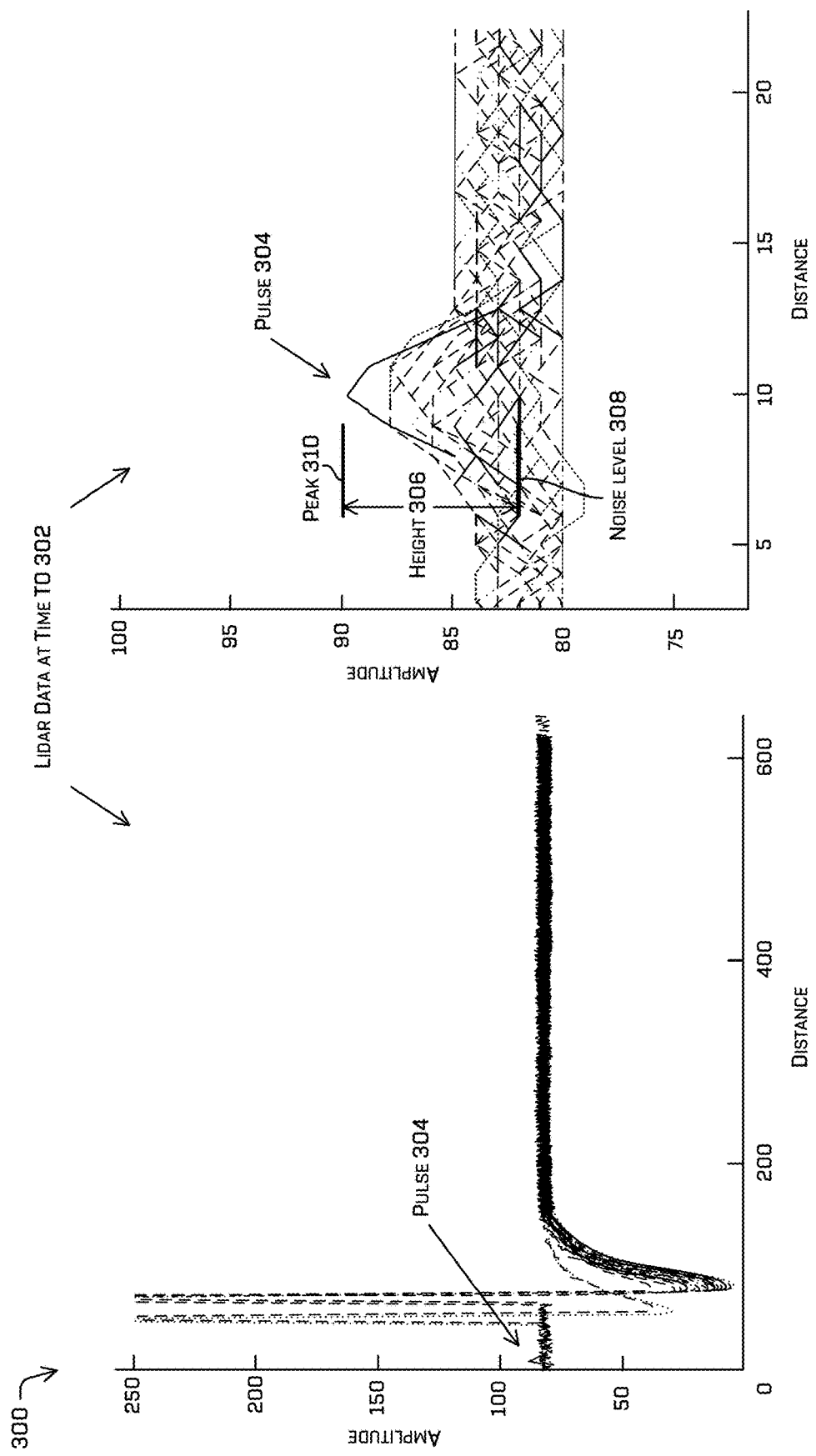
FIG. 3 is a pictorial diagram illustrating example pulse information usable to detect an obstruction associated with an example sensor.

FIG. 3 is a pictorial diagram illustrating example pulse information 300 usable to detect an obstruction associated with an example sensor. For instance, the computing device 102 and/or the vehicle computing device 206 can include the obstruction detection component 104 to detect an obstruction associated with the lidar sensor 110 and/or one of the sensor system(s) 204.

The obstruction detection component 104 can detect behavior (e.g., an abnormality, anomaly, or difference in behavior over time) in pulse data that represents the obstruction to the lidar sensor. For example, the obstruction detection component 104 can receive lidar data 302 captured by the lidar sensor at time T0 and identify a pulse 304 within a threshold distance of the lidar sensor (e.g., within 10 millimeters of the lens or housing of the lidar sensor). As shown in in FIG. 3, the pulse 304 can include a height 306 represented by a difference between a noise level 308 (e.g., an amplitude of 83 during normal operation) and a peak 310 of the pulse 304.

In various examples, the obstruction detection component 104 can determine a difference between a baseline pulse height and the height 306 of the pulse 304, and determine, based at least in part on the difference, a degree of transparency associated with the lens of the lidar sensor. Of course, a width or other pulse characteristics (e.g., a shape, a polarization, spectral content (e.g., color information), coherence of light, etc.) may also be considered by the obstruction detection component 104. In some examples, the degree of transparency can be compared to a transparency threshold, and based on the comparison, an action as described herein can be performed (e.g., an action can be performed when the degree of transparency is below a transparency threshold). In some examples, the transparency threshold and/or detection of the obstruction may be based at least in part on a known excitation energy (e.g., transmission laser intensity) and/or otherwise normalized based at least in part on a lidar output power.

In some examples, the difference between the baseline pulse height and the height 306 of the pulse 304 can be compared to a difference threshold, and based on the comparison, the action as described herein can be performed. That is, the obstruction detection component 104 can output data representing the difference to the vehicle computing device 206 to cause the vehicle 202 to perform an action independent of determining the degree of transparency, the obstruction score, or the like.

The obstruction detection component 104 can, based on a comparison of the degree of transparency to the transparency threshold, request lidar point cloud data, and compare information associated with the pulse 304 to the lidar point cloud data. For instance, the lidar point cloud data can include an area of the environment with few or no lidar returns at various distances from the lens of the lidar sensor usable to validate presence of an obstruction on the lens. The pulse 304 can be indicative of an obstruction when the height 306 meets or exceeds the height threshold, and the lidar point cloud data can confirm the obstruction when an area one meter or more from the lidar sensor has limited or no lidar data points. The height threshold may be associated with an amplitude expected for a given number of samples at a particular azimuth and channel (e.g., azimuth 0 degrees and channel 12). As a non-limiting example, a threshold associated with an amplitude for return signals (e.g., raw sensor data) may be normalized to an output power such that when low power is used, the threshold is lowered.

In some examples, the obstruction detection component 104 can determine presence of an obstruction based at least in part on pulse information received over time (e.g., changes in pulse information associated with the pulse 304 and another pulse at time T1 after time T0). In some examples, determining an amount of transparency through the lens of the lidar sensor (e.g., an obstruction score) can be based at least in part on a change in a degree of transparency of a lidar sensor from time T0 to time T1. The obstruction detection component 104 can, for instance, compare pulses at time T0 and time T1 (at a same or different power output), and changes in the degree of transparency can be determined accordingly. Based on the comparison between the pulses and associated with degrees of transparency, the obstruction detection component 104 can confirm, verify, or modify an amount of transparency determination for the lidar sensor.

The obstruction detection component 104 can, in some examples, determine an obstruction type (e.g., rain, dirt, dust, snow, ice, animal droppings, etc.) based at least in part on the behavior of the pulse data. For example, the obstruction detection component 104 can determine an obstruction score indicating an amount of lidar beam energy lost and/or transmitted based at least in part on the obstruction type (e.g., a classification of the obstruction). That is, different obstructions can cause different pulse characteristics, and the obstruction detection component 104 can be trained to identify the pulse behavior associated with each type of obstruction. For instance, ground truth for a machine learned model can include manually or machine learned labels assigned to different pulse characteristics to identify an obstruction type.

The obstruction detection component 104 can predict, identify, or otherwise determine behavior of pulses associated with sensor data in a variety of ways. For instance, obstructions can behave differently over time depending upon characteristics of the obstruction, motion of the lidar sensor (e.g., due to a speed of a vehicle on which the sensor is coupled), environmental conditions surrounding the sensor, as well as the potential for multiple obstructions to cover a single sensor. In such examples, the obstruction detection component 104 can predict presence of animal droppings based at least in part on implementing a machine learned model that is trained using training data that accounts for characteristics of animal droppings (e.g., a shape, a transparency, a change in shape over time, etc.). In some examples, the training data can include characteristics for various animal droppings types as well as vehicle data, environmental data, map data, etc. to enable the obstruction detection component 104 to take into consideration a speed of the lidar sensor, weather conditions proximate the lidar sensor, a rate that the obstruction can spread over time (e.g., a change of shape over time), and so on. Though the example above discusses animal droppings, other obstruction types and characteristics thereof can also be considered when training the obstruction detection component 104 to predict behavior of pulses in sensor data. In this way, the obstruction detection component 104 can detect and classify obstructions associated with changes in transparency for an outer surface of a sensor with consideration to motion, position, elevation, of the sensor as well as the weather, and the affects thereof on the obstruction. In some examples, the obstruction detection component 104 can predict that an obstruction will occur at a future time (e.g., an obstruction that is not on the lens). For example, one or more sensors (an image sensor, lidar sensor, radar sensor, and/or other sensor type) can detect that water is coming from another vehicle due to a vehicle initiated windshield system. Using the techniques described herein, the obstruction detection component 104 can predict that the obstruction will reach the sensor in the future, and can initiate an action prior to the obstruction covering a lens of the sensor. For example, a cleaning operation like an air jet can be ready to dispel the water based at least in part on the prediction. Another action can include changing a vehicle trajectory to reduce an impact of the obstruction (e.g., reducing a vehicle speed to reduce an impact of an obstruction on the sensor such as slowing down to avoid mud that is flying towards the sensor and potentially obstruct the sensor).

Figure 4:
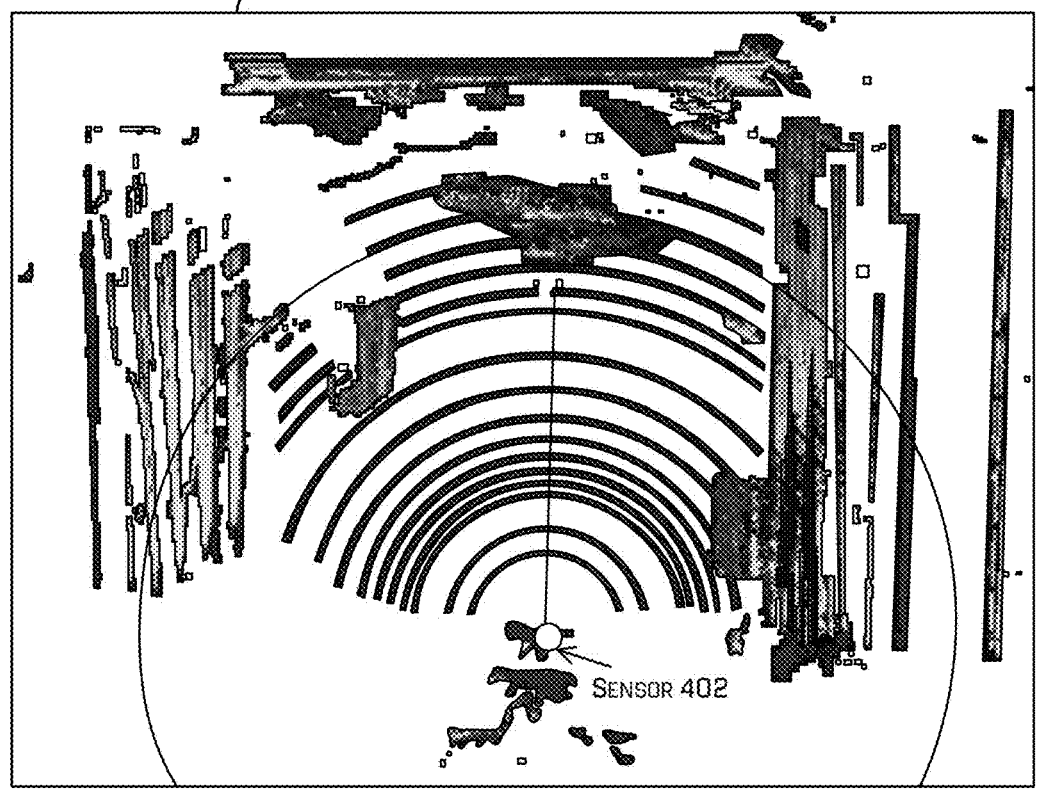
FIG. 4 is a pictorial diagram illustrating an example implementation to detect an obstruction based on example lidar cloud data.
Figure 4:
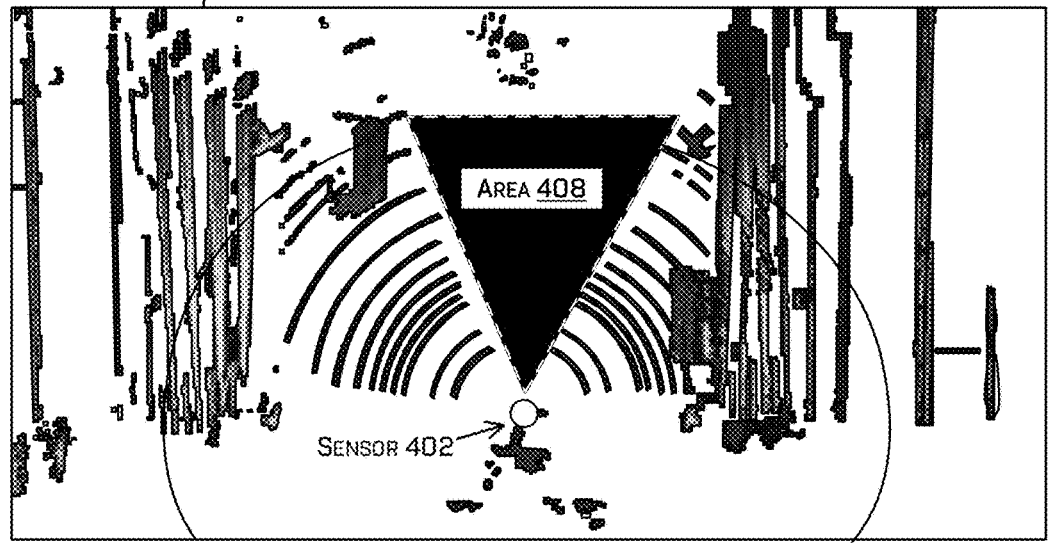

FIG. 4 is a pictorial diagram 400 illustrating an example implementation to detect an obstruction based on example lidar cloud data. For instance, the obstruction detection component 104 can receive lidar cloud data associated with a lidar sensor 402 and detect the obstruction 106 based at least in part on an amount of lidar data points in a particular area or region adjacent to the lidar sensor 402.

FIG. 4 depicts lidar cloud data without an obstruction 404 and lidar cloud data with an obstruction 406. The lidar cloud data with the obstruction 406 includes an area 408 comprising a range of distances with little or no data points (e.g., lidar returns). In various examples, the area 408 can vary in size, shape, and/or distance depending on data captured by the lidar sensor 402. As mentioned above, the lidar cloud data can be used by the obstruction detection component 104 to verify an obstruction determination that is based on raw lidar data. For example, in examples when the obstruction detection component 104 determines an obstruction score indicating a low transparency due to a particular type of obstruction, the lidar point cloud data can be used to validate the obstruction score, adjust the obstruction score, or confirm the obstruction type.

In various examples, the lidar point cloud data can be associated with a same lidar sensor as the raw lidar data or another lidar sensor different form the lidar sensor used to capture the raw lidar data. For instance, the vehicle 202 may include multiple lidar sensors, and different sensors can be used to capture raw lidar data and lidar point cloud data.

In some examples, the obstruction detection component 104 can determine whether the lack of data points in the area 408 is caused by an obstruction or an error in capturing the lidar point cloud data (e.g., an uncalibrated lidar sensor). For instance, a field of view of another lidar sensor, radar sensor, image sensor, etc., can be used to confirm whether the area 408 is an occluded region in an environment or an obstruction on a lens of the lidar sensor.

Figure 5:
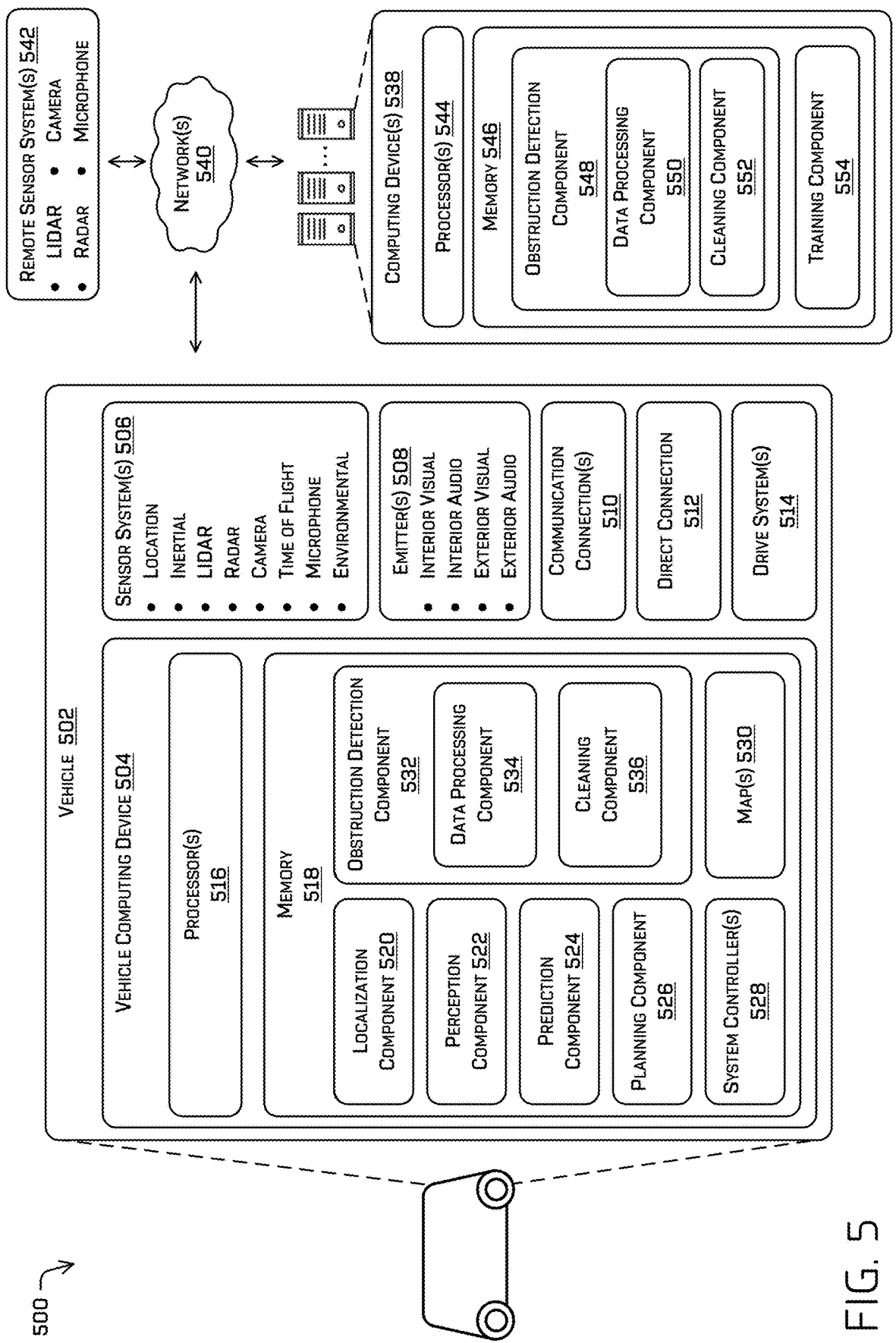
FIG. 5 is a block diagram of an example system for implementing the techniques described herein.

FIG. 5 is a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 540 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522, a prediction component 524, a planning component 526, one or more system controllers 528, one or more maps 530, and an obstruction detection component 532 including a data processing component 534, and a cleaning component 536. Though depicted as residing in the memory 518 for illustrative purposes, it is contemplated that the localization component 520, the perception component 522, the prediction component 524, the planning component 526, the one or more system controllers 528, the one or more maps 530, the obstruction detection component 532, the data processing component 534, and the cleaning component 536 may additionally, or alternatively, be accessible to the vehicle 502 (e.g., stored on, or otherwise accessible by, memory remote from the vehicle 502, such as, for example, on memory 546 of a remote computing device 538).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530 and/or a remote map component, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 524 can generate one or more probability maps representing prediction probabilities of possible locations of one or more objects in an environment. For example, the prediction component 524 can generate one or more probability maps for vehicles, pedestrians, animals, and the like within a threshold distance from the vehicle 502. In some instances, the prediction component 524 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 524 may generate predicted trajectories of objects (e.g., objects) in an environment and/or to generate predicted candidate trajectories for the vehicle 502. For example, the prediction component 524 may generate one or more predicted trajectories for objects within a threshold distance from the vehicle 502. In some examples, the prediction component 524 may measure a trace of an object and generate a trajectory for the object based on observed and predicted behavior.

In general, the planning component 526 may determine a path for the vehicle 502 to follow to traverse through an environment. For example, the planning component 526 may determine various routes and trajectories and various levels of detail. For example, the planning component 526 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 526 can select a trajectory for the vehicle 502 (e.g., the trajectory 214) based at least in part on receiving data representing an output of the obstruction detection component 532.

In other examples, the planning component 526 can alternatively, or additionally, use data from the localization component 520, the perception component 522, and/or the prediction component 524 to determine a path for the vehicle 502 to follow to traverse through an environment. For example, the planning component 526 can receive data from the localization component 520, the perception component 522, and/or the prediction component 524 regarding objects associated with an environment. Using this data, the planning component 526 can determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage. Additionally or alternatively, the planning component 526 can determine the path for the vehicle 502 to follow based at least in part on data received from the obstruction detection component 104 as described in FIGS. 1-4 and elsewhere.

In at least one example, the vehicle computing device 504 may include one or more system controllers 528, which may be configured to control steering, propulsion, braking, safety, emitters, communication, and other systems of the vehicle 502. The system controller(s) 528 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 524, and/or the planning component 526 to determine a location of the vehicle 502, detect objects in an environment, generate routes, determine actions and/or trajectories to navigate within an environment.

In some examples, the one or more maps 530 may be stored on a remote computing device(s) (such as the computing device(s) 538) accessible via network(s) 540. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

As illustrated in FIG. 5, the vehicle computing device 504 may include the obstruction detection component 532 configured to perform the functionality of the obstruction detection component 104, including detecting an obstruction on or near a sensor of the sensor system(s) 506. In various examples, the obstruction detection component 532 may receive sensor data, vehicle data, and the like from the perception component 522 and/or from the sensor system(s) 506. In some examples, the obstruction detection component 532 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the obstruction detection component 532 could be part of the prediction component 524, the planning component 526, or other component(s) of the vehicle 502.

In various examples, the obstruction detection component 532 can analyze the sensor data to determine if an individual sensor of the vehicle 502 is faulty. For instance, the obstruction detection component 532 can determine presence of an obstruction (e.g., water, dirt, snow, plastic, cloth, etc. covering at least a portion of a sensor (or region in front of the sensor) based at least in part on analyzing pulse information included in the sensor data. In examples when an obstruction is detected on or near a lens of the sensor, the obstruction detection component 532 can perform an action (e.g., initiate a cleaning operation to remove the obstruction from the sensor, control the vehicle 502, adjust a parameter of the sensor, generate a request for lidar point cloud data, and so on).

The data processing component 534 can include functionality to analyze the sensor data to determine characteristics associated with an obstruction of a sensor. For example, the data processing component 534 can determine a size, a location, and/or a type of obstruction associated with the sensor. In some examples, the data processing component 534 can determine a degree of transparency associated with the lens of the sensor, and perform the action based at least in part on the characteristics and/or the degree of transparency. The data processing component 534 can, for instance, include at least the functionality of data processing component 208.

The cleaning component 536 can include functionality to clean a sensor to remove an obstruction. For instance, the cleaning component 536 can include at least the functionality of the cleaning component 210. In various examples, the cleaning component 536 can cause air, water, or types of cleaning to remove the obstruction at a location on the sensor.

In some examples, the vehicle 502 may send sensor data to the computing device(s) 538 via the network(s) 540. In some examples, the vehicle 502 may receive sensor data from the computing device(s) 538 and/or remote sensor system(s) 542 via the network(s) 540. The sensor data may include raw sensor data and/or processed sensor data and/or representations of sensor data. In some examples, the sensor data (raw or processed) may be sent and/or received as one or more log files. In one example, the sensor data can correspond to the lidar data 114 and can include historical obstruction scores for one or more sensors.

The computing device(s) 538 may include processor(s) 544 and a memory 546 storing an obstruction detection component 548, a data processing component 550, and a cleaning component 552, and a training component 554. In various examples, the obstruction detection component 548 may be configured to receive data from one or more remote sensors, such as the sensor system(s) 506 and/or remote sensor system(s) 542. In some examples, the obstruction detection component 548 may be configured to process the data and send processed sensor data to the vehicle computing device 504, such as for use by the perception component 522, the prediction component 524, and/or the planning component 526. In some examples, the obstruction detection component 548 may be configured to send calibration score data to the vehicle computing device 504.

The obstruction detection component 548 can be configured to perform the functionality of the obstruction detection component 104, including predicting an obstruction score for a sensor coupled to the vehicle 502. For instance, a determination of an obstruction score indicative of a degree of transparency for a lens of a sensor can be based at least in part on comparing pulse information to a threshold, comparing multiple pulses one to another, and/or comparing raw lidar data to lidar point cloud data.

The data processing component 550 can include at least the functionality of the obstruction detection component 104. For example, the data processing component 550 can process sensor data from one or more sensors of the sensor system(s) 506 to initiate an action to mitigate a detected obstruction.

The cleaning component 552 can include functionality to clean one or more sensors of the sensor system(s) 506. For instance, the cleaning component 552 can include at least the functionality of the cleaning component 210 including generating a cleaning action directed to a portion of the sensor curve.

As can be understood, the components discussed herein (e.g., the obstruction detection component 548, the data processing component 550, and the cleaning component 552) are described as divided for illustrative purposes. However, the operations performed by the various components may be combined or performed in any other component.

Determinations by the obstruction detection component 532 and/or the obstruction detection component 548 can be used by various components of the vehicle computing device 504. For example, obstruction scores associated with a sensor can be used to cause the vehicle 502 to take an action (e.g., a relatively low score can cause the vehicle to stop, pull over, etc., determine a maximum speed for the vehicle to operate, etc.) and/or cause a change in sensor contributions (e.g., a poorly operating sensor can contribute less to sensor fusion).

In some instances, the training component 554 can include functionality to train a machine learning model to output probabilities for whether pulse information is associated with an obstruction and/or a classification of an obstruction. For example, the training component 554 can receive sensor data that represents an obstruction (and optionally an obstruction type) and at least a portion of the sensor data can be used as an input to train the machine learning model.

In some instances, the training component 554 may be executed by the processor(s) 544 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining an obstruction score associated with a lidar sensor and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 554 can include functionality to train a machine learning model to output classification values. For example, the training component 554 can receive data that represents labelled obstructions (e.g. publicly available data, sensor data, and/or a combination thereof). At least a portion of the data can be used as an input to train the machine learning model. Thus, by providing data where the vehicle traverses an environment, the training component 554 can be trained to output value(s) associated with obstructions on a lens of the sensor, as discussed herein.

In some examples, the training component 554 can include training data that has been generated by a simulator. For example, simulated training data can represent examples where a vehicle collides with an object in an environment or nearly collides with an object in an environment, to provide additional training examples. Different obstruction scores for s sensor can be simulated to determine an obstruction score threshold, or other threshold related to the sensor data (e.g., a pulse threshold, a transparency threshold, etc.).

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 546, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 516 of the computing device 504 and the processor(s) 544 of the computing device(s) 538 can be any suitable processor capable of executing instructions to process data and perform operations as described herein. By way of example and not limitation, the processor(s) 516 and the processor(s) 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the vehicle computing device 504 and the memory 546 of the computing device(s) 538 are examples of non-transitory computer-readable media. The memory 518 and the memory 546 can store an operating system and one or more software applications, instructions, programs, and/or data to implement the methods described herein and the functions attributed to the various systems. In various implementations, the memory 518 and 546 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determining a calibration score associated with a sensor to determine a level of accuracy of the sensor to allow the safe operation of an autonomous vehicle.

It should be noted that while FIG. 5 is illustrated as a distributed system, in alternative examples, components of the vehicle 502 may be associated with the computing device(s) 538 and/or components of the computing device(s) 538 may be associated with the vehicle 502. That is, the vehicle 502 may perform one or more of the functions associated with the computing device(s) 538, and vice versa.

Figure 6:
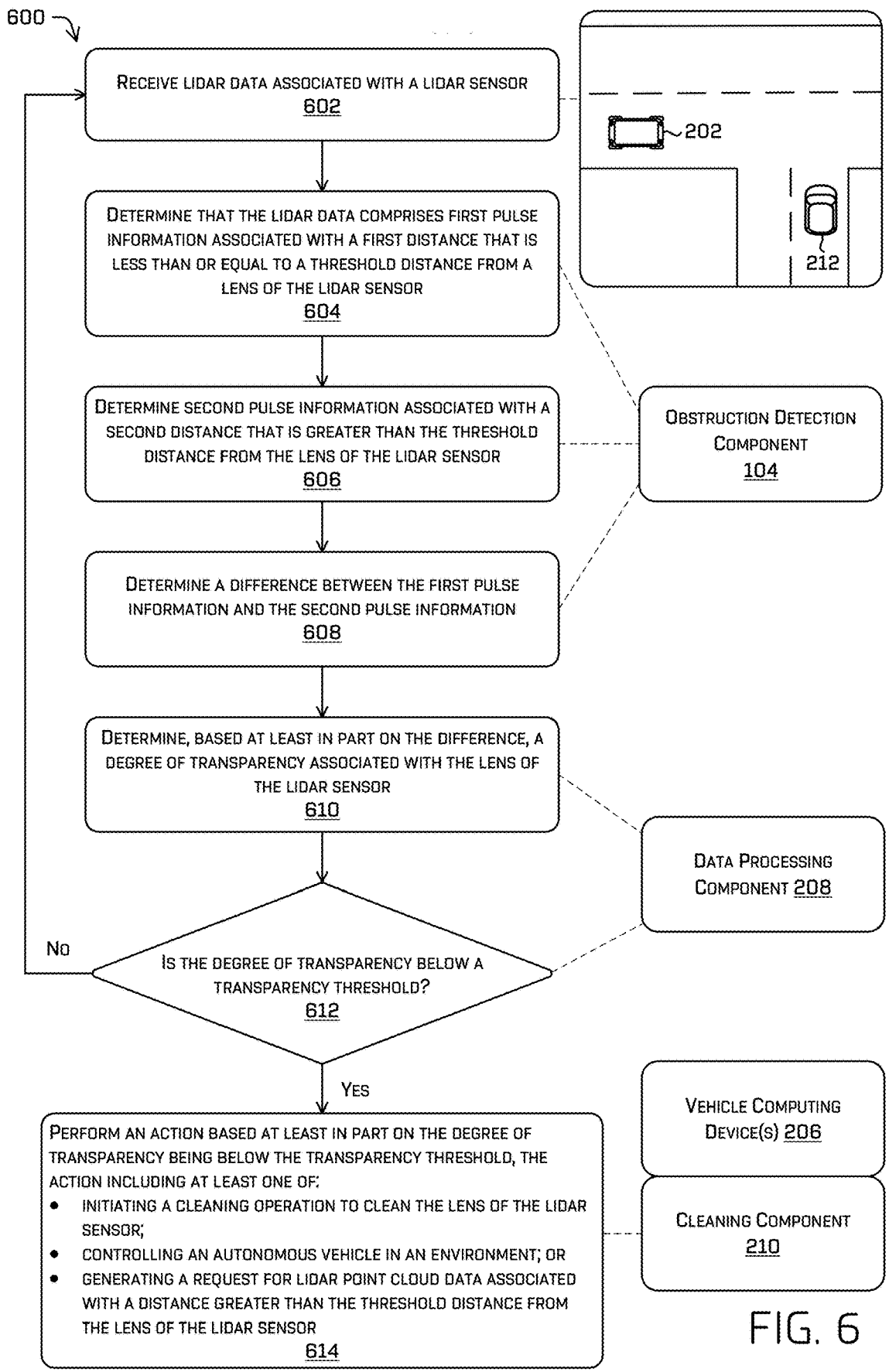
FIG. 6 is a flowchart depicting an example process for detecting an obstruction on a lens of a sensor using one or more example components.

FIG. 6 is an example process 600 for detecting an obstruction on a lens of a sensor using one or more example components. For example, some or all of the process 600 can be performed by one or more components in FIG. 5, as described herein. For example, some or all of the process 600 can be performed by the obstruction detection component 104, the obstruction detection component 532, and/or the obstruction detection component 548.

At operation 602, the process can include receiving lidar data associated with a lidar sensor. In some examples, the operation 602 can include receiving or capturing lidar data from a lidar sensor that comprises a first lidar scan of an environment at a first time and a second lidar scan of the environment at a second time different from the first time. Of course, in some examples other sensor types such as time of flight sensors, radar sensors, sonar sensors, etc., can capture sensor data (e.g., receiving or capturing image data from one or more image sensors of an autonomous vehicle). The lidar data can be associated with a lidar sensor in a test environment or a lidar sensor coupled to a vehicle such as an autonomous vehicle traversing an environment. In some examples, the lidar data can be received over time such that the lidar data represents data captured by the lidar sensor at a first time and a second time. The lidar data can be received by the obstruction detection component 104 at substantially a same time that the lidar data is captured by the lidar sensor while in other examples the lidar data can be received after a period of time, or at pre-determined intervals (e.g., every two minutes, every threshold number of image frames, etc.).

At operation 604, the process can include determining that the lidar data comprises first pulse information associated with a first distance that is less than or equal to a threshold distance from a lens of the lidar sensor. As discussed herein, the obstruction detection component 104 can detect, identify, or otherwise determine pulse information (e.g., the pulse data 304) at a distance on or near a lens (e.g., the lens 108) of the lidar sensor. The threshold distance can, in various examples, be a distance of 5 millimeters, though other threshold distances are contemplated. In some examples, the lidar data can represent raw lidar data that includes some distance information while in other examples, the raw lidar data may represent time and/or frequency information from which the obstruction detection component 104 can determine a distance of pulse information associated with the lidar data. For example, the obstruction detection component 104 can apply one or more algorithms to the lidar data to determine pulse distance information that is not otherwise included as part of the lidar data including for direct time of flight lidar and indirect time of flight lidar.

At operation 606, the process can include determining second pulse information associated with a second distance that is greater than the threshold distance from the lens of the lidar sensor. As noted herein, the obstruction detection component 104 can detect, identify, or otherwise determine second pulse information at a distance greater than a pre-determined distance (e.g., 5 millimeters) from the lens (e.g., the lens 108) of the lidar sensor. By way of example and not limitation, the second pulse information can represent pulse data away from the lens. In some examples, only the first pulse information may be received.

At operation 608, the process can include determining a difference between the first pulse information and the second pulse information. The operation 608 can include the obstruction detection component 104 determining a difference between pulses detected in the first pulse information and the second pulse information. For instance, the obstruction detection component 104 can implement a mathematical algorithm, heuristic, and the like to identify difference(s) between the pulses. In examples when only the first pulse information is received, the obstruction detection component 104 determine a difference between one or more pulses associated with the first pulse information and a pulse threshold (e.g., the height threshold for the pulse 304).

At operation 610, the process can include determining, based at least in part on the difference, a degree of transparency associated with the lens of the lidar sensor. For example, the operation 610 can include the data processing component 208 determining an obstruction score for the lidar sensor 110 based at least in part on the difference between the first and second pulse information. Determining the obstruction score can also or instead be based at least in part the difference between one or more pulses associated with the first pulse information and the pulse threshold. Generally, the obstruction score can represent an impact of an obstruction on the transparency being emitted from the lidar sensor.

At operation 612, the process can include determining that the degree of transparency is below a transparency threshold. For example, the data processing component 208 can compare the value associated with the degree of transparency (e.g., the obstruction score) to a pre-determined transparency threshold representing an acceptable transparency for operation of the lidar sensor. For example, the data processing component 208 can determine that an obstruction score does not meet the transparency threshold for operating the lidar sensor.

The operation 612 may be followed by the operation 614 if the transparency is below a transparency threshold (e.g., "yes" in the operation 612). The operation 612 may continue to operation 602 if the transparency is not below a transparency threshold (e.g., "no" in the operation 612).

At operation 614, the process can include performing an action based at least in part on the degree of transparency being below the transparency threshold, the action including at least one of: initiating a cleaning operation to clean the lens of the lidar sensor; controlling an autonomous vehicle in an environment; or generating a request for lidar point cloud data associated with a distance greater than the threshold distance from the lens of the lidar sensor. As discussed herein, an output(s) from the obstruction detection component 104 can be sent to one or more of: a vehicle computing device (e.g., the vehicle computing device 206 or 504), a perception component (e.g., the perception component 522), a prediction component (the prediction component 524), a planning component (e.g., the planning component 526), the cleaning component 210, and the like. The output(s) from the obstruction detection component 104 can also or instead be sent to a remote computing device configured to train the obstruction detection component 104.

FIG. 6 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples described herein.

A: A system comprising: one or more processors; and one or more non-transitory computer-readable media storing computer-executable instructions that, when executed, cause the one or more processors to perform operations comprising: receiving lidar data associated with a lidar sensor; determining that the lidar data comprises first pulse information associated with a first distance that is less than or equal to a threshold distance from a lens of the lidar sensor; determining second pulse information associated with a second distance that is greater than the threshold distance from the lens of the lidar sensor; determining a difference between the first pulse information and the second pulse information; determining, based at least in part on the difference, a degree of transparency associated with the lens of the lidar sensor; determining that the degree of transparency is below a transparency threshold; performing an action based at least in part on the degree of transparency being below the transparency threshold, the action including at least one of: initiating a cleaning operation to clean the lens of the lidar sensor; controlling an autonomous vehicle in an environment; or generating a request for lidar point cloud data associated with a distance greater than the threshold distance from the lens of the lidar sensor.

B: The system of paragraph A, the operations further comprising: receiving angle information or spatial information associated with the lidar data; and determining, based at least in part on the angle information or the spatial information, a size of an obstruction associated with the lens of the lidar sensor, wherein performing the action is further based at least in part on the size of the obstruction.

C: The system of either paragraph A or B, the operations further comprising: receiving angle information or spatial information associated with the lidar data; and determining, based at least in part on the angle information or the spatial information, a region of the lens comprising an obstruction, wherein performing the action is further based at least in part on the region of the lens comprising the obstruction.

D: The system of any one of paragraphs A-C, the operations further comprising: determining, based at least in part on the degree of transparency, an obstruction on at least a portion of the lens of the lidar sensor; and determining, based at least in part on the degree of transparency, a classification of the obstruction, wherein performing the action is further based at least in part on the classification.

E: The system of paragraph D, wherein determining the classification of the obstruction is based at least in part on a comparison between the first pulse information and the second pulse information.

F: One or more non-transitory computer-readable media storing instructions executable by a processor, wherein the instructions, when executed, cause the processor to perform operations comprising: receiving lidar data associated with a lidar sensor; detecting a pulse of the lidar data associated with a distance less than a threshold distance from the lidar sensor; determining, based at least in part on detecting the pulse, a degree of transparency associated with a lens of the lidar sensor; determining that the degree of transparency is below a transparency threshold; performing an action based at least in part on the degree of transparency being below the transparency threshold, the action including at least one of: initiating a cleaning operation to clean the lens of the lidar sensor; controlling an autonomous vehicle in an environment; or generating a request for lidar point cloud data, the lidar point cloud data associated with a distance meeting or exceeding a distance threshold.

G: The one or more non-transitory computer-readable media of paragraph F, wherein determining the pulse comprises inputting the lidar data into a machine learned model and receiving, from the machine learned model, the determination.

H: The one or more non-transitory computer-readable media of either paragraph F or G wherein determining the pulse comprises determining a portion of the lidar data meets or exceeds a threshold difference from a noise floor.

I: The one or more non-transitory computer-readable media of any one of paragraphs F-H, wherein: the pulse comprises a first pulse generated in response to an emission from the lidar sensor, and determining the degree of transparency is based at least in part on the first pulse and a second pulse associated with the lidar data generated in response to the emission.

J: The one or more non-transitory computer-readable media of paragraph I, the operations further comprising: comparing, as a comparison, first angle information or first spatial information associated with the first pulse to second angle information or second spatial information associated with the second pulse; and determining, based at least in part on the comparison, a size or a location of an obstruction on the lidar sensor, wherein performing the action is further based at least in part on the size or the location of the obstruction on the lidar sensor.

K: The one or more non-transitory computer-readable media of any one of paragraphs F-J, wherein the action comprises generating a request for lidar point cloud data, the lidar point cloud data associated with a distance meeting or exceeding a distance threshold, and the operations further comprising: inputting the lidar point cloud data and the lidar data into a machine learned model; and receiving, from the machine learned model, an output indicating a likelihood that an obstruction on the lens of the lidar sensor, wherein performing the action is further based at least in part on the output.

L: The one or more non-transitory computer-readable media of any one of paragraphs F-K, wherein: the autonomous vehicle is bi-directional, and controlling the autonomous vehicle in the environment comprises determining a direction of travel for the autonomous vehicle based at least in part on a location of the lidar sensor on the autonomous vehicle.

M: The one or more non-transitory computer-readable media of any one of paragraphs F-L, wherein the lidar data includes raw lidar data that represents data prior to be converted to lidar point cloud data.

N: The one or more non-transitory computer-readable media of any one of paragraphs F-M, the operations further comprising: determining, based at least in part on the degree of transparency, an obstruction on at least a portion of the lens of the lidar sensor; and determining a classification of the obstruction, wherein performing the action is further based at least in part on the classification.

O: The one or more non-transitory computer-readable media of any one of paragraphs F-N, the operations further comprising: adjusting a power output of the lidar sensor based at least in part on the degree of transparency associated with the lens of the lidar sensor.

P: The one or more non-transitory computer-readable media of any one of paragraphs F-O, wherein detecting the pulse comprises comparing a first region associated with the lidar data to a second region associated with the lidar data.

Q: A method comprising: receiving lidar data associated with a lidar sensor; detecting a pulse of the lidar data associated with a distance less than a threshold distance from the lidar sensor; determining, based at least in part on detecting the pulse, a degree of transparency associated with a lens of the lidar sensor; determining that the degree of transparency is below a transparency threshold; performing an action based at least in part on the degree of transparency being below the transparency threshold, the action including at least one of: initiating a cleaning operation to clean the lens of the lidar sensor; controlling an autonomous vehicle in an environment; or generating a request for lidar point cloud data, the lidar point cloud data associated with a distance meeting or exceeding a distance threshold.

R: The method of paragraph Q, wherein initiating the cleaning operation to clean the lens of the lidar sensor comprises at least one of: generating a signal to cause an air jet or cleaning system to remove an obstruction on the lens of the lidar sensor, or adjusting a parameter of the lidar sensor to filter additional lidar data.

S: The method of either paragraph Q or R, further comprising: comparing, as a comparison, first angle information or first spatial information associated with a first pulse of the lidar data to second angle information or second spatial information associated with a second pulse of the lidar data; and determining, based at least in part on the comparison, a size or a location of an obstruction on the lidar sensor, wherein performing the action is further based at least in part on the size or the location of the obstruction on the lidar sensor.

T: The method of any one of paragraphs Q-S, wherein the action comprises generating a request for lidar point cloud data, the lidar point cloud data associated with a distance meeting or exceeding a distance threshold, and further comprising: inputting the lidar point cloud data and the lidar data into a machine learned model; and receiving, from the machine learned model, an output indicating a likelihood that an obstruction on the lens of the lidar sensor, wherein performing the action is further based at least in part on the output.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving lidar data associated with a lidar sensor;
determining that the lidar data comprises first pulse information indicating a first reflection of a first pulse at a first distance that is less than or equal to a threshold distance from a lens of the lidar sensor and that the first pulse was emitted at a first angle;
determining second pulse information indicating a second reflection of a second pulse at a second distance that is greater than the threshold distance from the lens of the lidar sensor and that the second pulse was emitted at a second angle;
determining a difference between the first distance and the second distance;
determining, based at least in part on the difference meeting or exceeding a threshold difference, a degree of transparency associated with the lens of the lidar sensor;
determining that the degree of transparency is below a transparency threshold; and
performing an action based at least in part on the degree of transparency being below the transparency threshold, the action including at least one of:
initiating a cleaning operation to clean the lens of the lidar sensor; or
causing an autonomous vehicle to traverse an environment.

2. The system of claim 1, the operations further comprising:
receiving angle information or spatial information associated with the lidar data; and
determining, based at least in part on the angle information or the spatial information, a size of an obstruction associated with the lens of the lidar sensor,
wherein performing the action is further based at least in part on the size of the obstruction.

3. The system of claim 1, the operations further comprising:
receiving angle information or spatial information associated with the lidar data; and
determining, based at least in part on the angle information or the spatial information, a region of the lens comprising an obstruction,
wherein performing the action is further based at least in part on the region of the lens comprising the obstruction.

4. The system of claim 1, the operations further comprising:
determining, based at least in part on the degree of transparency, an obstruction on at least a portion of the lens of the lidar sensor; and
determining, based at least in part on the degree of transparency, a classification of the obstruction,
wherein performing the action is further based at least in part on the classification.

5. The system of claim 4, wherein determining the classification of the obstruction is based at least in part on a comparison between the first pulse information and the second pulse information.

6. One or more non-transitory computer-readable media storing instructions executable by a processor, wherein the instructions, when executed, cause the processor to perform operations comprising:
receiving lidar data associated with a lidar sensor;
detecting a first pulse of the lidar data indicating a first reflection of the first pulse at a first distance that is less than or equal to a threshold distance from a lens of the lidar sensor, the first pulse emitted at a first angle;

detecting a second pulse of the lidar data indicating a second reflection of the second pulse at a second distance greater than the threshold distance from the lens of the lidar sensor, the second pulse emitted at a second angle;

determining a difference between the first distance and the second distance;

determining, based at least in part on the difference meeting or exceeding a threshold difference, a degree of transparency associated with the lens of the lidar sensor;

determining that the degree of transparency is below a transparency threshold; and performing an action based at least in part on the degree of transparency being below the transparency threshold, the action including at least one of:
  initiating a cleaning operation to clean the lens of the lidar sensor; or
  causing an autonomous vehicle to traverse an environment.

7. The one or more non-transitory computer-readable media of claim 6, wherein determining the degree of transparency associated with the lens of the lidar sensor comprises inputting the lidar data into a machine learned model and receiving, from the machine learned model, the degree of transparency.

8. The one or more non-transitory computer-readable media of claim 6, wherein determining the first pulse or the second pulse comprises determining a portion of the lidar data meets or exceeds a threshold difference from a noise floor.

9. The one or more non-transitory computer-readable media of claim 6, wherein:
  the first pulse is generated in response to an emission from the lidar sensor at the first angle, and
  determining the degree of transparency is based at least in part on the first pulse and the second pulse associated with the lidar data generated in response to the emission.

10. The one or more non-transitory computer-readable media of claim 6, the operations further comprising:
  comparing, as a comparison, the first angle or first spatial information associated with the first pulse to the second angle or second spatial information associated with the second pulse; and
  determining, based at least in part on the comparison, a size or a location of an obstruction on the lidar sensor,
  wherein performing the action is further based at least in part on the size or the location of the obstruction on the lidar sensor.

11. The one or more non-transitory computer-readable media of claim 6, wherein the action comprises generating a request for lidar point cloud data, the lidar point cloud data associated with the second distance exceeding the threshold distance, and the operations further comprising:
  inputting the lidar point cloud data and the lidar data into a machine learned model; and
  receiving, from the machine learned model, an output indicating a likelihood that an obstruction on the lens of the lidar sensor,
  wherein performing the action is further based at least in part on the output.

12. The one or more non-transitory computer-readable media of claim 6, wherein:
  the autonomous vehicle is bi-directional, and
  controlling the autonomous vehicle in the environment comprises determining a direction of travel for the autonomous vehicle based at least in part on a location of the lidar sensor on the autonomous vehicle.

13. The one or more non-transitory computer-readable media of claim 6, wherein the lidar data includes raw lidar data that represents data prior to be converted to lidar point cloud data.

14. The one or more non-transitory computer-readable media of claim 6, the operations further comprising:
  determining, based at least in part on the degree of transparency, an obstruction on at least a portion of the lens of the lidar sensor; and
  determining a classification of the obstruction,
  wherein performing the action is further based at least in part on the classification.

15. The one or more non-transitory computer-readable media of claim 6, the operations further comprising:
  adjusting a power output of the lidar sensor based at least in part on the degree of transparency associated with the lens of the lidar sensor.

16. The one or more non-transitory computer-readable media of claim 6, wherein detecting the first pulse or the second pulse comprises comparing a first region associated with the lidar data to a second region associated with the lidar data.

17. A method comprising:
  receiving lidar data associated with a lidar sensor;
  detecting a first pulse of the lidar data indicating a first reflection of the first pulse at a first distance less than or equal to a threshold distance from a lens of the lidar sensor, the first pulse emitted at a first angle;
  detecting a second pulse of the lidar data indicating a second reflection of the second pulse at a second distance greater than the threshold distance from the lens of the lidar sensor, the second pulse emitted at a second angle;
  determining a difference between the first distance and the second distance;
  determining, based at least in part on the difference meeting or exceeding a threshold difference, a degree of transparency associated with the lens of the lidar sensor;
  determining that the degree of transparency is below a transparency threshold; and
  performing an action based at least in part on the degree of transparency being below the transparency threshold, the action including at least one of:
    initiating a cleaning operation to clean the lens of the lidar sensor; or
    causing an autonomous vehicle to traverse an environment.

18. The method of claim 17, wherein initiating the cleaning operation to clean the lens of the lidar sensor comprises at least one of: generating a signal to cause an air jet or cleaning system to remove an obstruction on the lens of the lidar sensor, or adjusting a parameter of the lidar sensor to filter additional lidar data.

19. The method of claim 17, further comprising:
  comparing, as a comparison, the first angle or first spatial information associated with the first pulse of the lidar data to the second angle or second spatial information associated with the second pulse of the lidar data; and
  determining, based at least in part on the comparison, a size or a location of an obstruction on the lidar sensor,
  wherein performing the action is further based at least in part on the size or the location of the obstruction on the lidar sensor.

20. The method of claim 17, wherein the action comprises generating a request for lidar point cloud data, the lidar point cloud data associated with a distance meeting or exceeding a distance threshold, and further comprising:

inputting the lidar point cloud data and the lidar data into a machine learned model, and receiving, from the machine learned model, an output indicating a likelihood that an obstruction on the lens of the lidar sensor, wherein performing the action is further based at least in part on the output.

\* \* \* \* \*